(12) United States Patent
Sun et al.

(10) Patent No.: US 9,384,889 B2
(45) Date of Patent: Jul. 5, 2016

(54) VACUUM INDUCTION MELTING AND STRIP CASTING EQUIPMENT FOR RARE EARTH PERMANENT MAGNETIC ALLOY

(71) Applicant: SHENYANG NORTH VACUUM TECHNOLOGY CO., LTD., Shenyang, Liaoning (CN)

(72) Inventors: Baoyu Sun, Liaoning (CN); Xiaodong Chen, Liaoning (CN)

(73) Assignee: SHENYANG NORTH VACUUM TECHNOLOGY CO., LTD, Shenyang, Liaoning (CN)

( * ) Notice: Subject to any disclaimer, the term of this patent is extended or adjusted under 35 U.S.C. 154(b) by 99 days.

(21) Appl. No.: 14/370,965

(22) PCT Filed: Nov. 6, 2013

(86) PCT No.: PCT/CN2013/086631
§ 371 (c)(1),
(2) Date: Jul. 8, 2014

(87) PCT Pub. No.: WO2014/071843
PCT Pub. Date: May 15, 2014

(65) Prior Publication Data
US 2014/0352909 A1      Dec. 4, 2014

(30) Foreign Application Priority Data

Nov. 8, 2012   (CN) .......................... 2012 1 0442609

(51) Int. Cl.
*B22D 11/06*   (2006.01)
*H01F 41/02*   (2006.01)
(Continued)

(52) U.S. Cl.
CPC ........ *H01F 41/0266* (2013.01); *B22D 11/0611* (2013.01); *B22D 11/124* (2013.01);
(Continued)

(58) Field of Classification Search
CPC ........ B22D 46/00; B22D 45/00; B22D 11/06; B22D 11/0611
See application file for complete search history.

(56) References Cited

U.S. PATENT DOCUMENTS

| | | | | |
|---|---|---|---|---|
| 4,612,973 A | * | 9/1986 | Whang ................ | B22D 11/064 164/256 |
| 5,092,392 A | * | 3/1992 | Bagdal .................. | G01B 13/12 164/154.3 |
| 2010/0202917 A1 | * | 8/2010 | Nakajima ............. | B22F 1/0055 420/591 |

FOREIGN PATENT DOCUMENTS

GB        1260051 A  *  1/1972 ............. B22D 27/15

*Primary Examiner* — Kevin P Kerns
*Assistant Examiner* — Steven Ha

(57) ABSTRACT

A vacuum induction melting and strip casting equipment for rare earth permanent magnetic alloy includes a vacuum induction melting and strip casting chamber, a material receiving heat preservation treatment chamber, a cooling chamber and an isolation valve. The isolation valve is located between the material receiving heat preservation treatment chamber and the cooling chamber, the vacuum induction melting and strip casting chamber is located above the material receiving heat preservation treatment chamber, an outlet of a material guiding tube of the vacuum induction melting and strip casting chamber is corresponding to the material receiving heat preservation treatment chamber. Water-cooled electrodes, a vacuum pumping device, an inert gas introduction pipeline, a temperature measurement mechanism, a pressure gauge, a vacuum gauge and a safety valve are provided on the vacuum induction melting and strip casting chamber. The present invention improves the production efficiency and has high production performance and good consistence.

12 Claims, 2 Drawing Sheets

(51) Int. Cl.
*C22C 38/00* (2006.01)
*C22C 45/02* (2006.01)
*C22C 33/04* (2006.01)
*B22D 45/00* (2006.01)
*B22D 46/00* (2006.01)
*C01B 3/00* (2006.01)
*B22D 11/12* (2006.01)
*B22D 11/124* (2006.01)
*B22D 11/126* (2006.01)
*B22D 25/06* (2006.01)
*H01F 1/055* (2006.01)
*H01F 1/057* (2006.01)

(52) U.S. Cl.
CPC .......... *B22D11/126* (2013.01); *B22D 11/1213* (2013.01); *B22D 25/06* (2013.01); *B22D 45/00* (2013.01); *B22D 46/00* (2013.01); *C01B 3/001* (2013.01); *C22C 33/04* (2013.01); *C22C 38/00* (2013.01); *C22C 38/002* (2013.01); *C22C 38/005* (2013.01); *C22C 45/02* (2013.01); *H01F 1/0551* (2013.01); *H01F 1/0571* (2013.01); *Y02E 60/324* (2013.01)

VACUUM INDUCTION MELTING AND STRIP CASTING EQUIPMENT FOR RARE EARTH PERMANENT MAGNETIC ALLOY

CROSS-REFERENCE TO RELATED APPLICATIONS

This PCT application is based on application No. 201210442609.5 filed in China on Nov. 8, 2012, the contents of which are incorporated hereinto by reference.

BACKGROUND OF THE PRESENT INVENTION

1. Field of Invention

The present invention relates to a vacuum induction melting and strip casting equipment, and more particularly to a vacuum melting and strip casting equipment for melting NdFeB rare earth permanent magnetic alloys and rare earth hydrogen storage alloys.

2. Description of Related Arts

The NdFeB rare earth permanent magnet is widely used to Electronics, electrical appliances, electrical motors and so on, and has a more extensive use. The rare earth hydrogen storage alloy is the negative electrode material of the NiMH battery. It is widely used to electric tools and hybrid electric vehicles and so on, and has a more extensive use.

In the existing NdFeB rare earth permanent magnet manufacturing processes and vacuum melting and strip casting equipments, the raw material of the rare earth permanent magnetic alloy or the raw material of the rare earth hydrogen storage alloy is put into the melting crucible of the vacuum melting and strip casting equipment, under vacuum and protective atmosphere, the raw material is heated up and molten to form the molten alloy, and then is casted to the external surface of the copper cooling roller with water-cooling to form the alloy slice via the tundish at the controllable speed, the cooled alloy slice falls on the horizontal rotational water-cooled rotation plate for the second cooling, after the alloy slice being cooled, the furnace door of the vacuum and strip casting equipment is open, and the alloy slice is taken out, and then the alloy slice is installed into the material box of the vacuum heat treatment furnace, and sent to the vacuum heat treatment furnace for vacuum heat treatment.

By exploring, it is found that in spite that compared to the prior ingoting process and equipment, the product performance of the currently used vacuum melting and strip casting process and equipment is greatly improved, the product still has a lot of problems. While producing the rare earth permanent magnetic alloy slice, due to the uneven secondary cooling, the metallurgical structure of the product has the uneven grain distributions and meticulous small grains, and α-Fe is often separated out. While producing the rare earth hydrogen storage alloy, there are small amounts of manganese precipitation. These phenomena seriously affect the performance of the product, the alloy slice needs to be vacuum heat treated after this in the vacuum heat treatment furnace for eliminating the manganese precipitation and homogenizing the grains.

SUMMARY OF THE PRESENT INVENTION

Aiming at the above mentioned technical problems, the present invention provides a vacuum induction melting and strip casting equipment for rare earth permanent magnetic alloy which completes the rare earth alloy vacuum and strip casting slice, the thermal process and the cooling in the protective atmosphere of one device, so that the production efficiency is improved, the production performance is high, and the consistence is good.

The present invention comprises a vacuum induction melting and strip casting chamber, a material receiving heat preservation treatment chamber, a cooling chamber and an intra-chamber isolation valve, wherein the intra-chamber isolation valve is located between the material receiving heat preservation treatment chamber and the cooling chamber, the vacuum induction melting and strip casting chamber is located above the material receiving heat preservation treatment chamber, an outlet of a material guiding tube of the vacuum induction melting and strip casting chamber is corresponding to the material receiving heat preservation treatment chamber, and water-cooled electrodes, a vacuum pumping device, an inert gas introduction pipeline, a temperature measurement mechanism, a pressure gauge, a vacuum gauge and a safety valve are provided on the vacuum induction melting and strip casting chamber.

Furthermore, a furnace body is located within a vacuum chamber with a water-cooled interlayer of the vacuum induction melting and strip casting chamber, the furnace body comprises a crucible, a steel-made framework, heat-resistant bricks and a copper induction coil, wherein the heat-resistant bricks, the copper induction coil and the steel-made framework are located at a periphery of the crucible in turn, the crucible is located at a bottom of the furnace body via the steel-made framework, an outlet of the crucible is a material guiding mouth, the furnace body is fixed within the strip casting chamber via a support frame, a tilting mechanism is connected to the steel-made framework, another end of the tilting mechanism is fixed to an inner wall of the furnace body, a furnace cover is located at an upper portion of the vacuum chamber, and a furnace door is installed at one end of the vacuum chamber.

Furthermore, a tundish, a quenching copper roller and the material guiding tube are located within the strip casting chamber, the tundish is located between the material guiding mouth of the crucible and the quenching copper roller and is connected to a three-dimensional adjustment mechanism for adjusting a gap between a nozzle of the tundish and the quenching copper roller, the quenching copper roller is located below the tundish within the strip casting chamber, the material guiding tube is located below the quenching copper roller, a material receiving box is located at a lower portion of the material guiding tube, the material guiding tube is aligned to the material receiving box, a water-cooled tube circles around an outer wall of the material guiding tube, and a crushing roller is located within the material guiding tube.

Furthermore, the furnace cover is connected to the vacuum chamber via a hydraulic electric shifting device, a track is provided on the furnace cover, one end of the track is connected to a foundation via a shaft, and another end thereof is connected with a hydraulic cylinder, the hydraulic cylinder is connected to the strip casting chamber, a driver gear and a passive gear, which rolls along the track, are provided at the furnace cover, the driver gear is connected with a reducer shaft of a first motor via a sprocket and a chain, an observation window is provided on the furnace cover, and an observation window with a camera is provided on the furnace door.

Furthermore, a material receiving box, an insulation chamber and a friction roller transmission mechanism are located within the material receiving heat preservation treatment chamber, an insulation board is located at an inner wall of the insulation chamber, a heater is located within the insulation board, the friction roller transmission mechanism comprises a motor reducer, a plurality of transmission sprockets and chains, a plurality of friction rollers arranged in parallel, and a plurality of friction roller shafts thereof, wherein the friction roller shafts are located within the material receiving heat preservation treatment chamber, two ends of each of the friction roller shafts passes through the insulation board for connecting with one sprocket, two sprockets of two adjacent friction roller shafts are connected with each other via the chain, and the sprocket at an end of every friction roller shaft is connected with the motor reducer outside the material receiving heat preservation treatment chamber via a dynamic sealing sprocket shaft.

Furthermore, the material receiving box is open, a non-circle cross-sectional tube penetrating through the material receiving box is welded at a side of the material receiving box, the shaped tube has a hole communicating with the material receiving box, while receiving materials, the material receiving box reciprocates along a friction roller transmitting at a bottom of the material receiving heat preservation treatment chamber.

Furthermore, a motor is located at a side wall of the cooling chamber, a wind tank is located within the cooling chamber, a plurality of diversion ducts are located at a side wall of the wind tank, a heat exchanger is located at another side wall of the wind tank, an outlet of the heat exchanger faces a fan which is connected with a shaft of the second motor, an arched diversion baffle is located at a periphery side wall of the cooling chamber, a vacuum pumping pipeline and an inert gas induction pipeline are connected with an exterior of the cooling chamber, and the vacuum pumping pipeline is connected with the vacuum pumping device.

The beneficial effects of the present invention are as follows:

Compared with the existing vacuum induction heating and strip casting furnace, in the present invention, the rare earth alloy vacuum and strip casting slice, the thermal process and the cooling are completed in the protective atmosphere of one device, so that the production efficiency is improved, the production performance is high, and the consistence is good. The present invention avoids the uneven slice stirring, slow cooling, low efficiency, and high power consumption of the existing single chamber vacuum induction heating and strip casting furnace. It avoids slice adhesion and oxidating the slice during logistics process. Under the premise of energy saving, the production capacity and the consistency of the product are greatly improved, the service life of the equipment is increased and the maintenance time of the equipment is shortened.

DETAILED DESCRIPTION OF THE PREFERRED EMBODIMENT

The present invention is further explained in detail with the accompanying drawings and embodiments.

Embodiment

Figure 1:
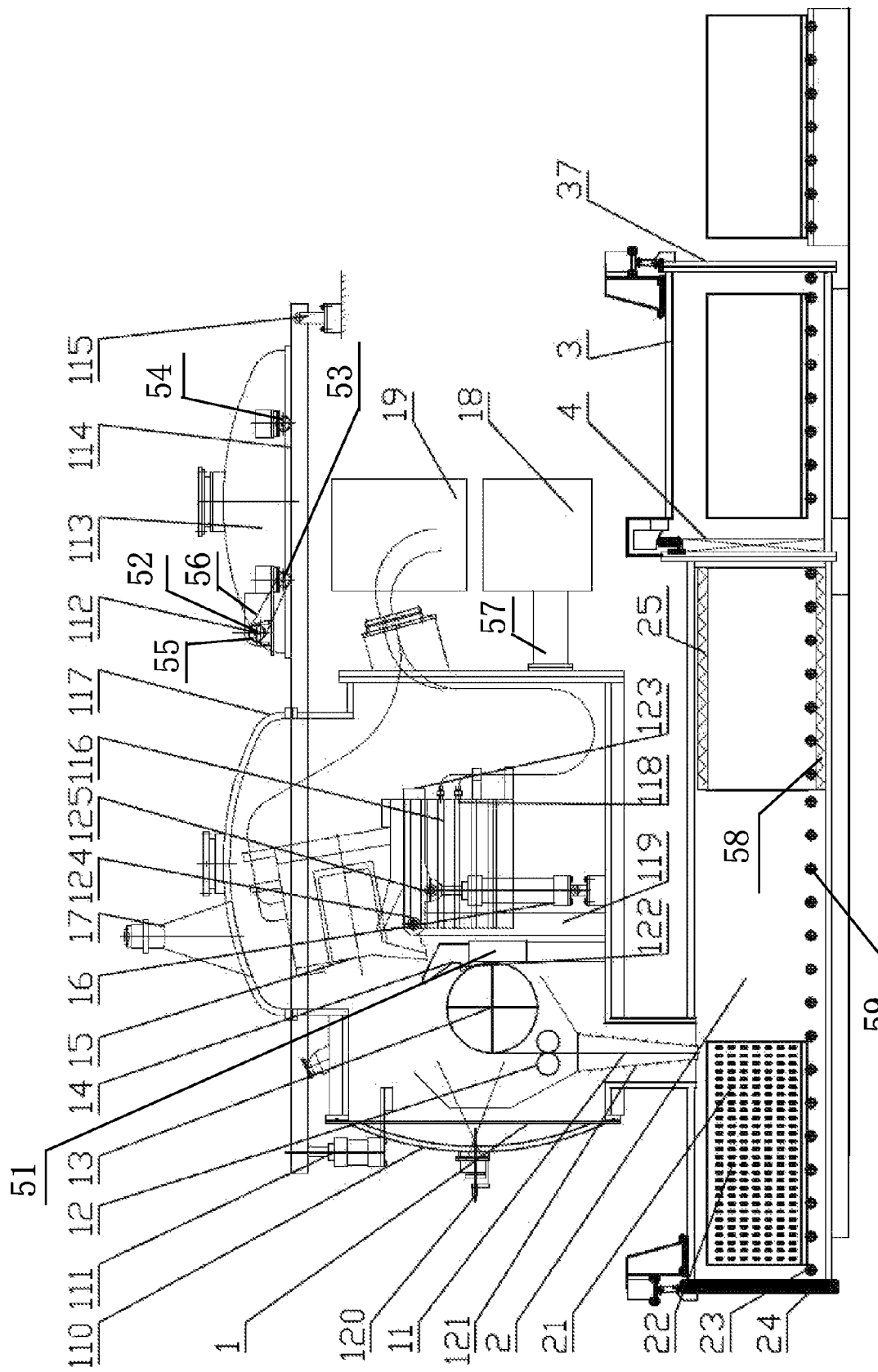
FIG. 1 is a perspective view of the present invention.

As shown in FIG. 1, the present invention comprises a vacuum induction melting and strip casting chamber 1, a material receiving heat preservation treatment chamber 2, a cooling chamber 3 and an intra-chamber isolation valve 4, wherein the intra-chamber isolation valve 4 is located between the material receiving heat preservation treatment chamber 2 and the cooling chamber 3, the vacuum induction melting and strip casting chamber 1 is located above the material receiving heat preservation treatment chamber 2, an outlet of a material guiding tube 11 of the vacuum induction melting and strip casting chamber 1 is corresponding to the material receiving heat preservation treatment chamber 2, and the water-cooled electrodes, a vacuum pumping device 18, an inert gas introduction pipeline, a temperature measurement mechanism, a pressure gauge, a vacuum gauge and a safety valve are provided on the vacuum induction melting and strip casting chamber 1. The temperature measurement mechanism is the armored thermocouple.

A furnace body 118 is located within a vacuum chamber with a water-cooled interlayer 117 of the vacuum induction melting and strip casting chamber 1. The furnace body 118 comprises a crucible 15, a steel-made framework 123, heat-resistant bricks and a copper induction coil 116, wherein the crucible 15 is located at a bottom of the furnace body 118 via the steel-made framework 123, an outlet of the crucible 15 is a material guiding mouth, the steel-made framework 123 is connected with a support frame 119 via a first shaft 124, a tilting mechanism 16 is connected to the steel-made framework 123, another end of the tilting mechanism 16 is fixed to an inner wall of the furnace body, a furnace door 110, which is capable of manually flipping opening or closing, is installed at one end of the vacuum chamber, an observation window with a camera 120 is provided on the furnace door 110, a furnace cover 113 is installed at an upper portion of the vacuum chamber, and the furnace cover 113 has an observation window 17.

The tilting mechanism 16 has an existing structure, a hydraulic cylinder of the tilting mechanism is connected with the steel-made framework 123 via a second shaft 125, under the drive of the hydraulic cylinder, the steel-made framework 123 turns around the first shaft 124 and the second shaft 125 to pour the material into a tundish 14.

The furnace cover 113 is connected to the vacuum chamber via a hydraulic electric shifting device. A track 114 is provided on the furnace cover 113. One end of the track 114 is connected to the foundation via a shaft 115, and another end thereof is connected with a hydraulic cylinder 111. The hydraulic cylinder 111 is connected to the strip casting chamber 1. A driver gear 53 and a passive gear 54, which rolls along the track 114, are provided at the furnace cover 113. The driver gear 53 is connected with a reducer shaft 52 of a first motor 112 via a sprocket 55 and a chain 56.

The tundish 14, a quenching copper roller 13 and the material guiding tube 11 are located within the strip casting chamber 1 which is located above the material receiving heat preservation treatment chamber 2. The tundish 14 is located between the material guiding mouth of the crucible 15 and the quenching copper roller 13 and is connected to a three-dimensional adjustment mechanism 51 for adjusting a gap between a nozzle of the tundish 14 and the quenching copper roller 13. The three-dimensional adjustment mechanism 51 has an existing structure, wherein three linear slide rail components coordinated with each other are respectively located at three axis directions. The tundish is fixed on a bedplate at one of the three axes, and the bedplate moves along X-axis, Y-axis and Z-axis. The quenching copper roller 13 is located below the tundish 14 within the strip casting chamber, the material guiding tube 11 is located below the quenching copper roller 13, a material receiving box 21 is located at a lower portion of the material guiding tube 11, the material guiding tube 11 is aligned to the material receiving box 21. A water-cooled tube 121 circles around an outer wall of the material guiding tube 11, a crushing roller 12 is located within the material guiding tube 11 and a and strip casting slice is changed to a slice with smaller size via the crushing roller 12 and falls into the material receiving box 21.

The material receiving box 21 is a steel-made square box, wherein a sealing board is welded at a bottom surface thereof, the box has an open top surface, a non-circle cross-sectional tube 22 penetrating through the material receiving box 21 is welded at a side of the material receiving box, the shaped tube 22 has a hole communicating with an inner cavity of the material receiving box 21, while receiving materials, the material receiving box 21 reciprocates along a friction roller 23 transmitting at a bottom of the material receiving heat preservation treatment chamber 2.

The material receiving box 21, an insulation chamber 25 and a friction roller transmission mechanism are located within the material receiving heat preservation treatment chamber 2. An insulation board 58 is located at an inner wall of the insulation chamber 25, and a heater is located within the insulation board 58. The friction roller transmission mechanism comprises a motor reducer, a plurality of transmission sprockets 55 and chains 56, a plurality of friction rollers 23 arranged in parallel, and a plurality of friction roller shafts 59 thereof, wherein the friction roller shafts 59 are located within the material receiving heat preservation treatment chamber 2, two ends of each of the friction roller shafts 59 passes through the insulation board 58 for connecting with one sprocket, two sprockets of two adjacent friction roller shafts 59 are connected with each other via the chain, and the sprocket at an end of every friction roller shaft 59 is connected with the motor reducer outside the material receiving heat preservation treatment chamber 2 via the dynamic sealing sprocket shaft.

Figure 2:
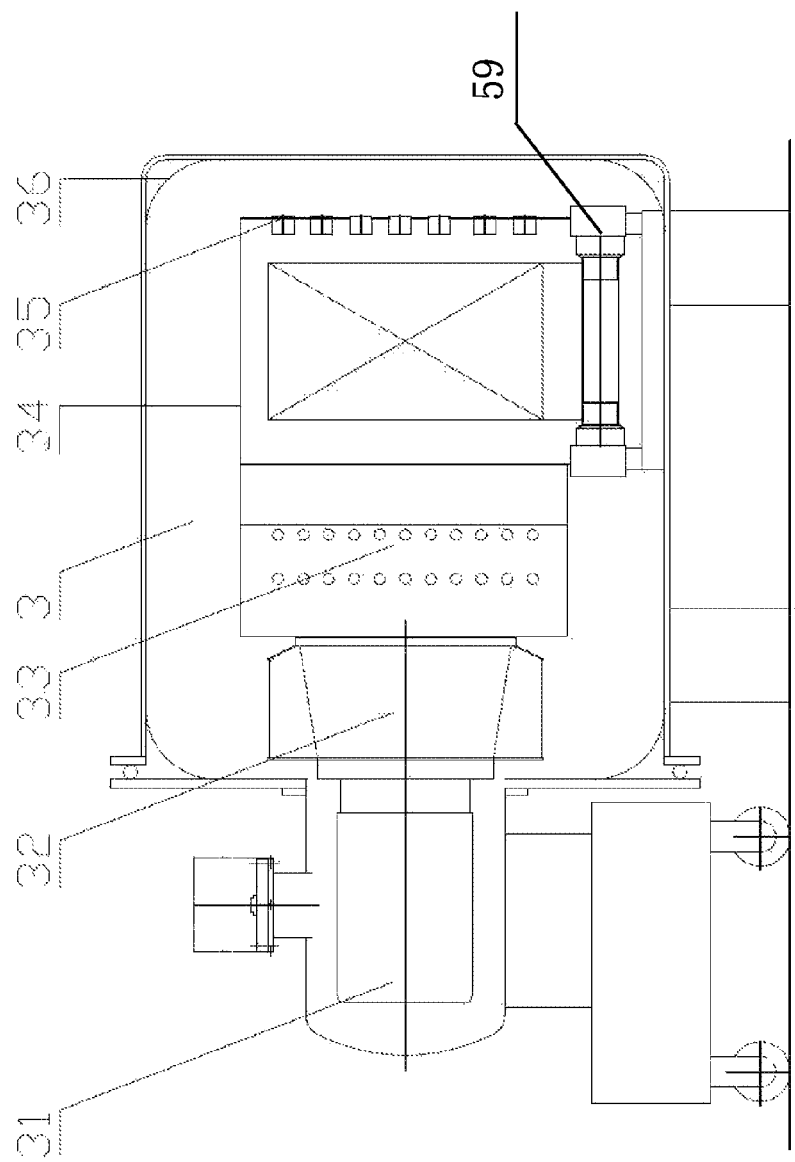
FIG. 2 is a perspective view of a cooling device in FIG. 1.
In the drawings: 1. Strip casting chamber; 11. Material guiding tube; 12. Crushing roller; 13. Quenching copper roller; 14. Tundish; 15. Crucible; 16: Tilting mechanism; 17. Observation window; 18. Vacuum pumping device; 19. Medium frequency induction power supply; 110. Furnace door; 111. Hydraulic cylinder; 112. First motor; 113. Furnace cover; 114. Track; 115. Shaft; 116. Induction coil; 117. Water-cooled interlayer; 118. Furnace body; 119. Support frame; 120. Camera; 121. Water-cooled tube; 122. Nozzle; 123. Steel-made framework; 124. First shaft; 125. Second shaft; 2. Material receiving heat preservation treatment chamber; 21. Material receiving box; 22. Shaped tube; 23. Friction roller; 24. 1# chamber door; 25. Insulation chamber; 3. Cooling chamber; 31. Second motor; 32. Fan; 33. Heat exchanger; 34. wind tank; 35. diversion duct; 36. Diversion baffle; 37. 2# chamber door; 4. Isolation valve; 51. Three-dimensional adjustment mechanism; 52. Reducer shaft; 53. Driver gear; 54. Passive gear; 55. Sprocket; 56. Chain; 57. Vacuum pumping pipeline; 58. Insulation board; 59. Friction roller shaft.

As shown in FIG. 2, a second motor 31 is located at a side wall of the cooling chamber 3, a wind tank is located within the cooling chamber, a diversion duct 35 is located at a side wall of the wind tank, a heat exchanger 33 is located at another side wall of the wind tank, an outlet of the heat exchanger 33 faces a fan 32 which is connected with a shaft of the second motor 31, a diversion baffle 36 is located at a peripheral side wall of the cooling chamber 3, an exterior of the cooling chamber is connected with a vacuum pumping pipeline 57, the inert gas introduction pipeline, and a safety valve pipeline, and the vacuum pumping pipeline 57 is connected with the vacuum pumping device.

While working, under vacuum and/or protective atmosphere, the induction coil 116 is electrified by a medium frequency induction power supply 19 located outside the vacuum furnace for heating up the furnace charge in the crucible 15, after the furnace charge is molten and fully alloyed, the molten furnace charge outflows along the material guiding mouth of the crucible 15 to cast into the tundish 14 below the material guiding mouth of the crucible via the tilting mechanism. A nozzle 122 is provided at a place where the tundish 14 contacts with the quenching copper roller 13. The molten alloy in the tundish is spray casted to an external surface of the rotating quenching copper roller 13 via the nozzle 122, and the molten alloy is cooled at the surface of the quenching copper roller 13 to form the alloy slice. The slice falls into the material guiding tube 11 below the quenching copper roller with the rotation of the the quenching copper roller 13. The crushing roller 12 is located within the material guiding tube 11, after passing through the crushing roller 12, the alloy slice is smashed to fine fragments and falls into the material receiving box 21 below the reciprocating material guiding tube 11. After completing the cast, the material receiving box 21 containing the fragments moves into the insulation chamber 25 for heat preservation. After completing the heat preservation, the isolation valve 4 is open, the material receiving box 21 is moved to the cooling chamber 3, and then the isolation valve 4 is closed (at this time, the second furnace melting begins), the second motor 31 starts cooling for cooling the material receiving box 21 and the fragments therein. The heat exchanger 33 is located between the fan 32 and the material receiving box 21, the shaped tube 22 is located on the material receiving box 21, the cooled gas takes away the heat on the fragments by the shaped tube 22. Under the driving of the fan 32, the heated gas is cooled by the heat exchanger 33 and blows to the material receiving box 21 by the fan 32, the diversion baffle 36 and the diversion duct 35 of the wind tank. When the material receiving box 21 reaches a tamping temperature, the second motor 31 is stopped cooling, and then a release valve is open, when a pressure in the cooling chamber is equilibrium with that of the atmosphere, a door 37 of 2# chamber is open, and the material receiving box is moved outside the cooling chamber. Till now, a furnace production is completed.

The using process of the present invention is as follows:

Under the atmospheric pressure, the furnace door 110 is manually open, and the furnace cover 113 is electrically open. The R—Fe—B-M raw material (R is one or more of Nd, Pr, Dy and Tb rare earth elements, and M is one or more of Co, Al, Cu, Zr and Ga) proportioned by material component and weight is installed into the crucible 15 of the vacuum induction melting and strip casting equipment. The furnace door 110 and the furnace cover 113 are closed, the pressure is reduced to a specified pressure (such as lower than 5 Pa) by the vacuum pumping device 18 of two roots pumps connected in series and two slice valve pumps connected in parallel, an inert gas introduction valve is open for charging the inert gas into the furnace, under vacuum and protective atmosphere, the medium frequency induction power supply 19 is started, and the raw material is molten to the molten alloy by induction heating.

After being fully alloyed (such as refining process for 30 minutes), at the set temperature (such as 1460° C.), the molten alloy outflows along the material guiding mouth of the crucible 15 to cast into the tundish 14 below the material guiding mouth of the crucible by the tilting mechanism 16. The alloy liquid is spray casted to the external surface of the rotating quenching copper roller 13 for cooling via the nozzle 122 on the tundish 14. The rotational speed of the quenching copper roller 13 can be set according to technological requirements.

The alloy slice cooled by the rotating quenching copper roller 13 falls into the material receiving box 21 below the material guiding tube via the material guiding tube 11, the crushing roller 12 is located on the material guiding tube 11, and a water cooled tube 121 is provided at a tube wall of the material guiding tube.

The friction roller 23 is located within the material receiving heat preservation treatment chamber 2, while receiving materials, the material receiving box 21 horizontally reciprocates for avoiding the adhesion of the alloy fragments due to the clockwise accumulation thereof. The materials received by the material receiving box 21 are timely sent to the insulation chamber 25 for heat preservation, the holding temperature is set according to technical requirements (such as 500° C.-900° C.), and the temperature is hold for a period of time (such as more than 30 minutes).

The heat preserved alloy slice is sent to the cooling chamber 3, the second motor 31 is located at the side wall of the cooling chamber 3, the wind tank 34 is located within the cooling chamber, a plurality of diversion ducts 35 are located at the side wall of the wind tank 34, the heat exchanger 33 is located at another side wall of the wind tank, the outlet of the heat exchanger 33 faces the fan 32 which is connected with the shaft of the second motor 31, and the arched diversion baffle 36 is located at the wall of the cooling chamber. While reaching the required tapping temperature (such as 80° C.), the alloy slice is taken out of the cooling chamber.

To improve efficiency, the vacuum isolation valve 4 is located between the insulation chamber 25 and the cooling chamber 3. After heat preservation, the material receiving box 21 is sent to the cooling chamber 3 for cooling, and the second furnace charge can be molten at this time. The vacuum isolation valve 4 is designed to a board plug valve and is sealed by a cylinder driving a four-linkage bar to tightly press a valve plate gasket. Two chamber doors, which are respectively 1# chamber door 24 and 2# chamber door 37, are respectively provided between the material receiving heat preservation treatment chamber 2 and the cooling chamber 3 and the atmosphere for discharging materials, repair and maintenance.

Ordinary skilled in the profession should be able to understand the essence of the present invention, and recognize that the specific implementation details of the present invention can make a variety of changes within the scope of the claims.

What is claimed is:

1. A vacuum induction melting and strip casting equipment for rare earth permanent magnetic alloy, comprising a vacuum induction melting and strip casting chamber, a material receiving heat preservation treatment chamber, a cooling chamber and an intra-chamber isolation valve;
   wherein the intra-chamber isolation valve is located between the material receiving heat preservation treatment chamber and the cooling chamber, the vacuum induction melting and strip casting chamber is located above the material receiving heat preservation treatment chamber, an outlet of a material guiding tube of the vacuum induction melting and strip casting chamber is corresponding to the material receiving heat preservation treatment chamber;
   wherein a tundish, a quenching copper roller and the material guiding tube are located within the strip casting chamber, the tundish is located between a material guiding mouth of a crucible and the quenching copper roller and is connected to a three-dimensional adjustment mechanism for adjusting a gap between a nozzle of the tundish and the quenching copper roller, the quenching copper roller is located below the tundish within the strip casting chamber, the material guiding tube is located below the quenching copper roller, a material receiving box is located at a lower portion of the material guiding tube, and the material guiding tube is aligned to the material receiving box;
   wherein a water-cooled tube circles around an outer wall of the material guiding tube, and a crushing roller is located within the material guiding tube.

2. The vacuum induction melting and strip casting equipment for rare earth permanent magnetic alloy, as recited in claim 1, wherein a furnace cover is connected to a vacuum chamber via a hydraulic electric shifting device, a track is provided on the furnace cover, one end of the track is connected to a foundation via a shaft, and another end thereof is connected with a hydraulic cylinder, the hydraulic cylinder is connected to the strip casting chamber, a driver gear and a passive gear, which rolls along the track, are provided at the furnace cover, and the driver gear is connected with a reducer shaft of a first motor via sprockets and chains.

3. The vacuum induction melting and strip casting equipment for rare earth permanent magnetic alloy, as recited in claim 2, wherein an observation window is provided on the furnace cover.

4. The vacuum induction melting and strip casting equipment for rare earth permanent magnetic alloy, as recited in claim 1, wherein an observation window with a camera is provided on a furnace door.

5. The vacuum induction melting and strip casting equipment for rare earth permanent magnetic alloy, as recited in claim 1, wherein a furnace body is located within a vacuum chamber with a water-cooled interlayer of the vacuum induction melting and strip casting chamber, the furnace body comprises the crucible, a steel-made framework, and a copper induction coil, wherein the copper induction coil and the steel-made framework are located at a periphery of the crucible in turn, the crucible is located at a bottom of the furnace body via the steel-made framework, an outlet of the crucible is the material guiding mouth, the furnace body is fixed within the strip casting chamber via a support frame, a tilting mechanism is connected to the steel-made framework, another end of the tilting mechanism is fixed to an inner wall of the furnace body, a furnace cover is located at an upper portion of the vacuum chamber, and a furnace door is installed at one end of the vacuum chamber.

6. The vacuum induction melting and strip casting equipment for rare earth permanent magnetic alloy, as recited in claim 5, wherein a furnace cover is connected to the vacuum chamber via a hydraulic electric shifting device, a track is provided on the furnace cover, one end of the track is connected to a foundation via a shaft, and another end thereof is connected with a hydraulic cylinder, the hydraulic cylinder is connected to the strip casting chamber, a driver gear and a passive gear, which rolls along the track, are provided at the furnace cover, and the driver gear is connected with a reducer shaft of a first motor via sprockets and chains.

7. The vacuum induction melting and strip casting equipment for rare earth permanent magnetic alloy, as recited in claim 6, wherein an observation window is provided on the furnace cover.

8. The vacuum induction melting and strip casting equipment for rare earth permanent magnetic alloy, as recited in claim 6, wherein an observation window with a camera is provided on the furnace door.

9. The vacuum induction melting and strip casting equipment for rare earth permanent magnetic alloy, as recited in claim 1, wherein a motor is located at a side wall of the cooling chamber, a wind tank is located within the cooling chamber, a plurality of diversion ducts are located at a side wall of the wind tank, a heat exchanger is located at another side wall of the wind tank, an outlet of the heat exchanger faces a fan which is connected with a shaft of the motor, an arched diversion baffle is located at a periphery side wall of the cooling chamber, a vacuum pumping pipeline is connected with an exterior of the cooling chamber, and the vacuum pumping pipeline is connected with a vacuum pumping device.

10. A vacuum induction melting and strip casting equipment for rare earth permanent magnetic alloy, comprising a vacuum induction melting and strip casting chamber, a material receiving heat preservation treatment chamber, a cooling chamber and an intra-chamber isolation valve;
   wherein the intra-chamber isolation valve is located between the material receiving heat preservation treatment chamber and the cooling chamber, the vacuum induction melting and strip casting chamber is located above the material receiving heat preservation treatment chamber, an outlet of a material guiding tube of the vacuum induction melting and strip casting chamber is corresponding to the material receiving heat preservation treatment chamber;
   wherein a material receiving box, an insulation chamber and a friction roller transmission mechanism are located within the material receiving heat preservation treatment chamber, an insulation board is located at an inner wall of the insulation chamber, and a heater is located within the insulation board.

11. The vacuum induction melting and strip casting equipment for rare earth permanent magnetic alloy, as recited in claim 10, wherein the material receiving box is open, a noncircle cross-sectional tube penetrating through the material receiving box is welded at a side of the material receiving box, the tube has a hole communicating with the material receiving box, while receiving materials, the material receiving box reciprocates along a friction roller transmitting at a bottom of the material receiving heat preservation treatment chamber.

12. A vacuum induction melting and strip casting equipment for rare earth permanent magnetic alloy, comprising a vacuum induction melting and strip casting chamber, a material receiving heat preservation treatment chamber, a cooling chamber and an intra-chamber isolation valve;
   wherein the intra-chamber isolation valve is located between the material receiving heat preservation treatment chamber and the cooling chamber, the vacuum induction melting and strip casting chamber is located above the material receiving heat preservation treatment chamber, an outlet of a material guiding tube of the vacuum induction melting and strip casting chamber is corresponding to the material receiving heat preservation treatment chamber;
   wherein a motor is located at a side wall of the cooling chamber, a wind tank is located within the cooling chamber, a plurality of diversion ducts are located at a side wall of the wind tank, a heat exchanger is located at another side wall of the wind tank, an outlet of the heat exchanger faces a fan which is connected with a shaft of the motor, an arched diversion baffle is located at a periphery side wall of the cooling chamber, a vacuum pumping pipeline is connected with an exterior of the cooling chamber, and the vacuum pumping pipeline is connected with a vacuum pumping device.

\* \* \* \* \*